United States Patent [19]
Hosoya

[11] Patent Number: 4,811,316
[45] Date of Patent: Mar. 7, 1989

[54] APPARATUS FOR SEEKING A TRACK OF AN OPTICAL INFORMATION CARRIER IN WHICH A LOSS OF DETECTION SIGNAL IS COMPENSATED FOR

[75] Inventor: Hideki Hosoya, Yokohama, Japan

[73] Assignee: Canon Kabushiki Kaisha, Tokyo, Japan

[21] Appl. No.: 688,433

[22] Filed: Jan. 2, 1985

[30] Foreign Application Priority Data

Jan. 10, 1984 [JP] Japan .................................. 59-1399

[51] Int. Cl.⁴ .................... G11B 7/00; G11B 21/10
[52] U.S. Cl. .................................. 369/32; 369/43; 360/77.03
[58] Field of Search ............. 369/32, 43, 44; 360/77, 360/38.1, 78

[56] References Cited

U.S. PATENT DOCUMENTS

| | | | |
|---|---|---|---|
| 4,106,058 | 8/1978 | Romeas et al. | 369/32 |
| 4,138,663 | 2/1979 | Lehureau et al. | 369/44 |
| 4,285,015 | 8/1981 | Rose et al. | 360/77 X |
| 4,409,627 | 10/1983 | Eto et al. | 360/38.1 |
| 4,484,319 | 11/1984 | Koishi et al. | 369/32 X |
| 4,536,863 | 8/1985 | Giddings | 369/32 X |

FOREIGN PATENT DOCUMENTS

| | | |
|---|---|---|
| 2718092 | 8/1977 | Fed. Rep. of Germany . |
| 56-83874 | 7/1981 | Japan .................... 369/32 |
| 0148182 | 8/1984 | Japan .................... 69/32 |

OTHER PUBLICATIONS

Translation of Office Action dated 26 Oct. 1987, re German Patent Application P3500521.1-53.

Primary Examiner—Aristotelis M. Psitos
Attorney, Agent, or Firm—Fitzpatrick, Cella, Harper & Scinto

[57] ABSTRACT

Method and apparatus for seeking a desired one of a plurality of tracks formed on an optical information carrier are disclosed. The tracks are scanned by a light spot traversing the tracks, the tracks traversed by the light spot are detected, and the tracks detected are counted by a counter. When the light spot traverses a defect area on the track, the track which is not detected because of the defect area is also counted by the counter.

5 Claims, 5 Drawing Sheets

APPARATUS FOR SEEKING A TRACK OF AN OPTICAL INFORMATION CARRIER IN WHICH A LOSS OF DETECTION SIGNAL IS COMPENSATED FOR

BACKGROUND OF THE INVENTION

1. Field of the Invention

The present invention relates to method and apparatus for seeking a track of an optical information carrier, and more particularly to method and apparatus for seeking a desired one of a plurality of tracks formed on an optical information carrier in an optical information handling apparatus such as an optical disk device.

2. Description of the Prior Art

An optical information handling apparatus which records and reproduces information at a high density utilizing a light is known in the art. In an apparatus of this type, an information carrier made of a photosensitive recording material is rotated and a laser beam having a fine spot such as 1 µm in diameter is directed onto the information carrier to form recesses or holes or to change a reflection factor or magnetization direction so that information is recorded and reproduced. Examples of playback only products are optical video disks and digital audio disks, and an example of a record/playback product is an optical disk device used in an electronic file system. Signals to be recorded are video signals, audio signals and computer digital signal and the application field is expanding constantly.

On the optical information carrier used in the optical information handling apparatus, information is usually recorded on information tracks each comprising a series of recording pits. On a record/playback type information carriers, optically detectable guide tracks are formed to assure recording of signal at a small track pitch and at a high density and to assure accurate reproduction of the signal recorded at high density. Examples of the guide tracks are grooves formed on a base of the information carrier (pre-grooving) and guide tracks as well as track addresses and sector addresses written on the information carrier by a high power laser (pre-formatting).

Many of such information tracks and guide tracks are formed on the information carrier. For example, several tens of thousands of tracks are formed on the optical disk concentrically or spirally. The optical information handling apparatus must have a tracking mechanism for allowing an information writing or reading light spot to precisely follow the track and a seek mechanism for shifting the light spot to a desired track. An example of a prior art optical information handling apparatus equipped with such mechanisms is shown in FIG. 1.

In FIG. 1, an optical disk 21 which is an information carrier is rotated by a motor 22 around a spindle 23. A plurality of guide tracks . . . 24n−1, 24n, 24n+1, 24n+2, . . . , have been previously formed on the optical disk 21 as shown by A, and a light spot 26 is irradiated to the track 24n by a light head 25. The light beam of the light spot 26 is emitted from a semiconductor laser 27 in the light head and focused onto the optical disk 21 through a collimeter lens 28, a beam splitter 29 and an object lens 30. A drive current to the semiconductor laser 27 is modulated with recording information and the information is recorded on the guide track 24n by the light spot 26 in a form of record pits. A portion of the light reflected by the optical disk 21 is transmitted through the object lens 30, reflected by a beam splitter 29, transmitted through a condenser lens 31 and directed to a photo-detector 32. The photo-detector 32 has two split photosensing planes an a border line therebetween is oriented parallelly to a direction of a tangential line of the guide track 24n. The reflected light forms an image of the guide track 24n on the photosensing planes. If the light spot 26 deviates from the guide track 24n, a distribution of light intensity on the photosensing planes varies. Accordingly, by differentiating the outputs from the split photosensing planes by a differential amplifier 33, a tracking error signal is produced at a terminal 34. The object lens is moved in a direction B by a mechanical device (not shown) in accordance with the tracking error signal so that the light spot 26 always irradiates the guide track 24n. The tracking control is effected in this manner.

A method for shifting the light spot 26 to a desired record track, that is, a track seek method is now explained. In the track seeking, the optical head 25 is moved by a mechanism (not shown) radially of the optical disk (direction C) so that the light spot 26 scans across the guide tracks . . . 24n−1, 24n, 24n+1, 24n+2, . . . Each time the light spot traverses the guide track, a light intensity on the photosensing planes of the photo-detector 32 gradually decreases. Accordingly, the traverse of the guide track can be detected by utilizing the output at the terminal 34. By counting the number of traversed tracks, the guide tracks onto which the light spot was shifted is identified. Thus, when the target number of tracks to be traversed is given and the movement of the light spot is started, the detection signal indicating the traverse of the track by the light spot is counted, and when the count reaches the target number of tracks, the movement of the light spot is stopped. In this manner, the desired track can be sought at a high speed. Similar tracking and seeking are effected in reproducing the information.

However, as described above, a track pitch is very small in a high density information carrier. For example, the track pitch of the optical disk is 1–2 µm and a small defect area or dust causes partial defects of several to several tens of tracks. If such partial defects exist, the detection signal indicating the traverse of the track is not produced at the defect area even if the light spot traverses it. Accordingly, exact seeking is not achieved.

SUMMARY OF THE INVENTION

It is an object of the present invention to provide method and apparatus for seeking a track precisely and at a high speed even if a track on an information carrier contains a defect area.

In order to achieve the above object, in accordance with the present invention, a light spot is scanned to traverse a plurality of tracks formed on an optical information carrier, the tracks traversed by the light spot are detected, the number of tracks detected is counted, and when the light spot traverses a defect area on the track, the track which is not detected because of the defect area is counted.

The apparatus for seeking a track on the optical information carrier in accordance with the present invention comprises detection means for producing a detection signal each time a light spot traverses a track on the optical information carrier, correction means for producing a pseudo-detection signal having a loss of detection signal due to a defect area on the track corrected based on the detection signal, and counter means for counting the pseudo-detection signal produced by the correction means.

DETAILED DESCRIPTION OF THE PREFERRED EMBODIMENTS

Figure 1:
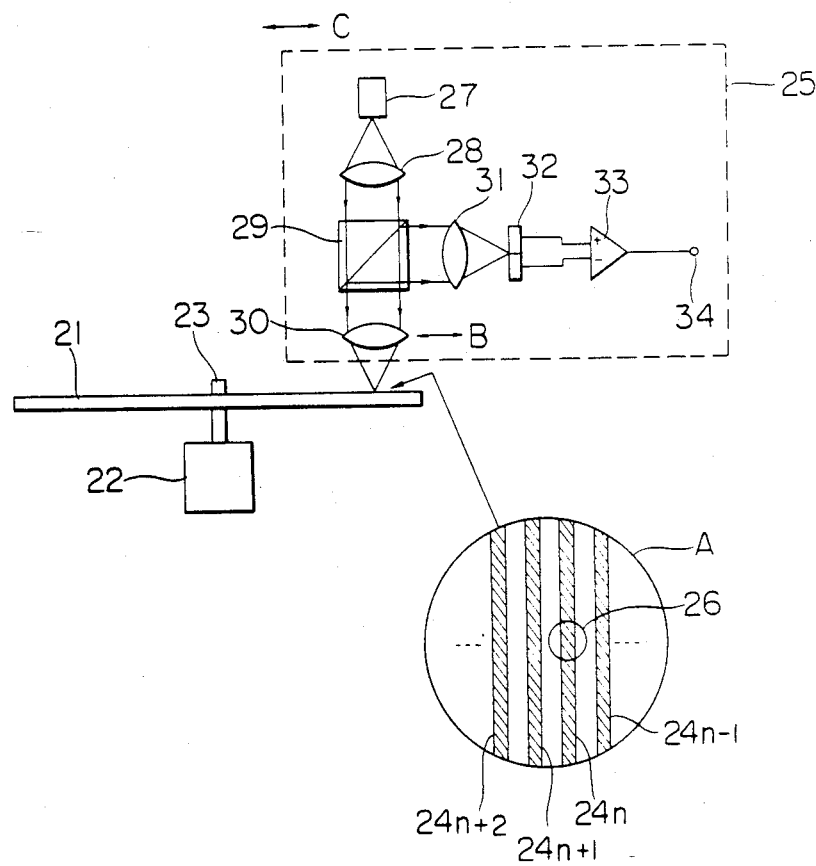
FIG. 1 shows a configuration of a prior art optical information handling apparatus.
Figure 2:
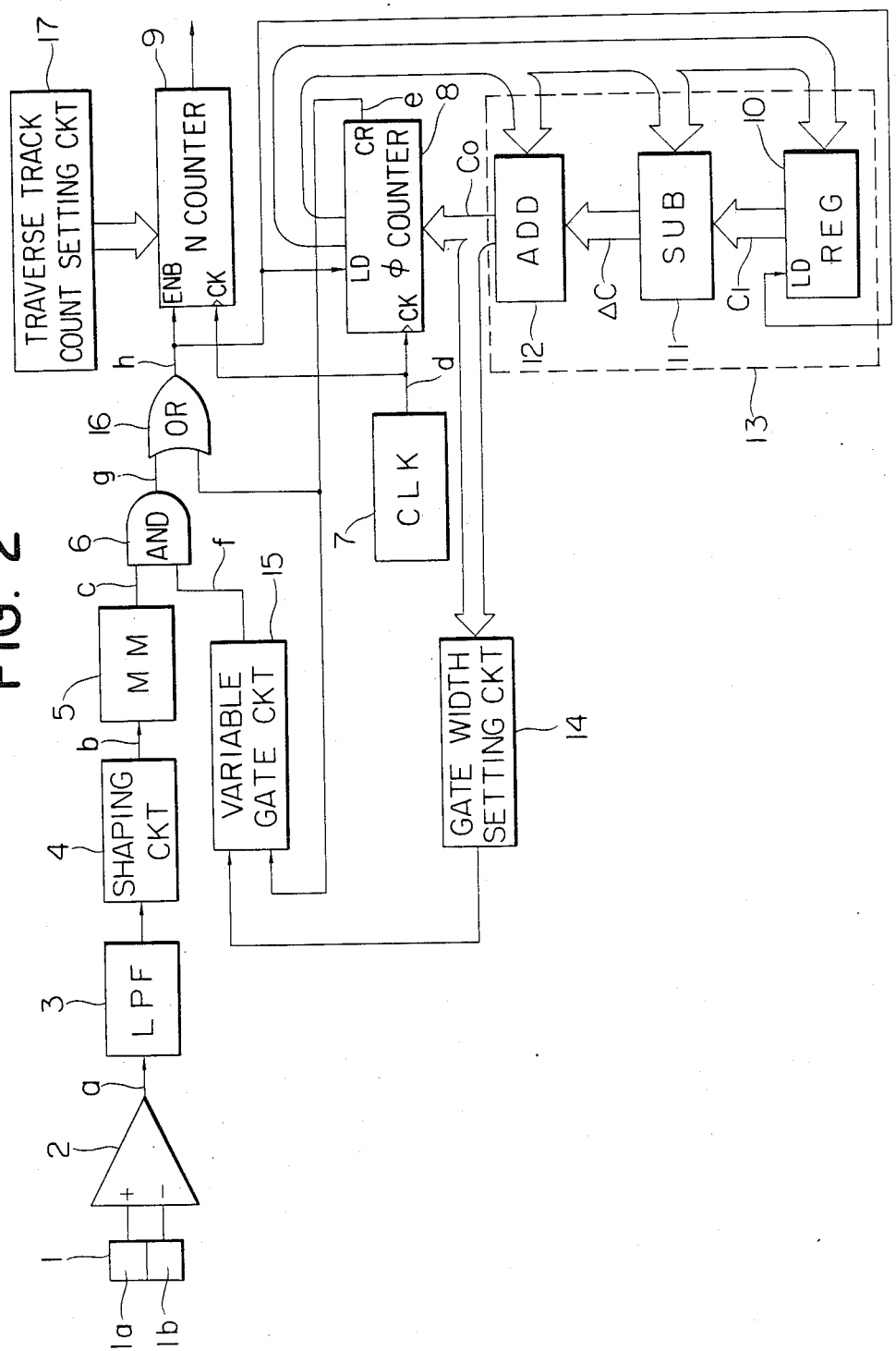
FIG. 2 is a block diagram of one embodiment of a track seek device for an optical information carrier, of the present invention.

FIG. 2 is a block diagram of one embodiment of the track seek device for the optical information carrier, of the present invention. The device of the present embodiment may be substituted for the elements 32 and 33 in the optical information handling apparatus shown in FIG. 1. In FIG. 2, a photo-detector 1 has two photo-sensing planes 1a and 1b, and a border line therebetween is oriented in parallel to a direction of a tangential line of a trach on an information carrier (not shown). Light intensities to the photo-sensing planes 1a and 1b change depending on the position of the track. The light intensities are photo-electrically converted and electrical signals are supplied from the photo-sensing planes 1a and 1b to a differential amplifier 2, which produces a difference output a corresponding to a difference between incident light intensities to the photo-sensing planes 1a and 1b and supplies it to a low-pass filter (LPF) 3. The LPF 3 is provided to eliminate noises other than a track traverse signal. The difference output a transmitted through the LPF 3 is supplied to a shaping circuit 4 where it is shaped into rectangular wave b, which is then supplied to a monostable multivibrator (MM) 5. The MM 5 is triggered by the rectangular wave b to produce a track traverse pulse c which has a pulse width determined by a time constant and as in synchronization and in phase with the rectangular pulse b, and supplies it to a first input terminal of an AND gate 6.

A clock oscillator (CLK) 7 generates clock pulses d having a sufficiently shorter period than a normal pulse interval of the track traverse pulse c, and supplies it to clock input terminals CK of a $\phi$ counter 8 and an N counter 9. The $\phi$ counter 8 counts the clock pulses d during the pulse interval of the track traverse pulse c, and the N counter 9 counts the track traverse pulses c.

The count output of the $\phi$ counter 8 is supplied to a register (REG) 10, a subtractor (SUB) 11 and an adder (ADD) 12. A count $C_1$ which is a content of the register 10 is supplied to the subtractor 11, which calculates a difference $\Delta C$ between the count $C_1$ of the register 10 and the count output of the $\phi$ counter 8 and supplies it to the adder 12. The adder 12 adds the output $\Delta C$ from the subtractor 11 to the count output of the $\phi$ counter 8 to produce a sum $C_0$, which is supplied to the $\phi$ counter 8 and a gate width setting circuit 14. The count $C_0$ is thus set into the $\phi$ counter 8. The circuit comprising the register 10, subtractor 11 and adder 12 is hereinafter called a count setting circuit 13.

The gate width setting circuit 14 determines a gate width in accordance with the output $C_0$ from the count setting circuit 13 and supplies the gate width to a variable gate circuit 15. The variable gate circuit 15 supplies a gate signal f to a second input terminal of the AND 6 in accordance with the gate width supplied from the gate width setting circuit 14 and a carry signal from a carry terminal CR of the $\phi$ counter 8. The AND 6 is opened or closed by the gate signal from the variable gate circuit 15 to gate or block the track traverse pulse c.

An output g from the AND 6 is supplied to a first input terminal of an OR gate 16. The OR 16 receives the output g of the AND 6 and the carry signal from the carry terminal CR of the $\phi$ counter 8 and produces a logical OR function thereof, that is, a pseudo track traverse pulse h, which is supplied to an enable terminal ENB of the N counter 9, a load terminal LD of the $\phi$ counter 8 and a load terminal LD of the register 10.

The N counter 9 is enabled while a high level signal is applied to the enable terminal ENB to count the pulses from the clock input terminal CK. Accordingly, by selecting the pulse width of the quasi track traverse pulse h from the OR 16 to correspond to one clock time (e.g. 20 ns) of the clock pulse d from the CLK 7, the pseudo track traverse pulses h can be counted.

A traverse track count setting circuit 17 may be a presettable counter in which the member of tracks for movement is set and the preset number of tracks for movement is supplied to the N counter 9. The N counter 9 counts the pseudo track traverse pulses h, and when the count reaches the preset number of tracks, it produces a carry signal at the carry terminal CR to inform that the light spot has reached the target position.

In the present embodiment thus constructed, the interval between the track traverse pulses c is measured by the CLK 7, $\phi$ counter 8 and count setting circuit 13, and if the track traverse pulse c is lost, the carry signal e as the pseudo pulse is generated by the $\phi$ counter 8. The operation of the present embodiment is now explained in detail with reference to waveforms shown in FIGS. 3 and 4.

Figure 3:
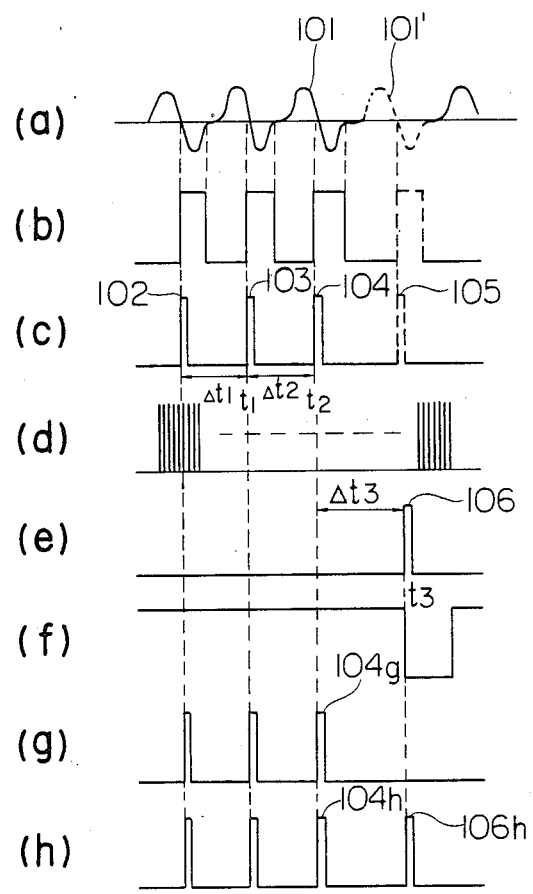
FIGS. 3(A) through 3(H) shows waveforms for explaining an operation of the embodiment of FIG. 2 when one track traverse pulse is lost.

FIG. 3 shows waveforms when one track traverse pulse c is lost. The waveforms in FIGS. 3(a)–3(h) correspond to the difference output, a, rectangular wave b, track traverse pulse c, clock pulse d, carry signal e of the $\phi$ counter 8, gate signal f and pseudo track traverse pulse h of FIG. 1, respectively.

FIG. 3(a) shows a waveform of the difference output a of the differential amplifier 2. When the light spot traverses the tracks, a waveform 101 (solid line) is produced. Because of a defect area on one track, a waveform 101' (broken line) indicating the traverse of that track is lost. The difference output a passes through the LPF 3, and only a negative component of the difference output a is shaped into the rectangular wave b by the shaping circuit 4 (FIG. 3(b)). A rectangular wave b corresponding to the waveform 101' is not produced. The rectangular wave b in FIG. 2(b) is supplied to the MM 5 which produces the track traverse pulse c (FIG. 3(c)). The track traverse pulse c shown in FIG. 3(c) has a time interval $\Delta t_1$ between pulses 102 and 103 and a time interval $\Delta t_2$ between pulses 103 and 104, and the pulses 103 and 104 are generated at $t_1$ and $t_2$, respectively. A pulse 105 shown by broken line in FIG. 3(c) is a pulse which would be generated if the guide track contains no defect. A manner of generating a pseudo pulse instead of the pulse 105 is now explained.

As described above, the $\phi$ counter 8 measures the interval between the track traverse pulses c by the count of the clock pulses d, and the count is stored in the register 10. Assume that the circuit of the present embodiment shown in FIG. 2 is in a state immediately before the time $t_2$ in FIG. 3(c), that is, immediately before the generation of the pulse 104. Under this condition, the register 10 contains a count $C_1$ of the clock pulse d corresponding to the time interval $\Delta t_1$ between the pulses 102 and 103, and the $\phi$ counter 8 contains a count $C_2$ of the clock pulses d corresponding to the time interval $\Delta t_2$ between the pulses 103 and 104. Assume that the count $C_2$ has not yet reached a preset count $C_0$ preset by the count setting circuit 13. Thus, the carry signal e is not produced and the variable gate 15 is held deactivated and the gate signal f is held at the high level.

Under this condition, assume that the pulse 104 of FIG. 3(c) is supplied from the MM 5 to the AND 6. Because the gate signal f is high level, the pulse 104 of the track traverse pulse c passes through the AND 6 to produce a pulse 104g, and it appears at the output terminal of the OR 16 as one pulse (pulse 104h) of the pseudo track traverse pulses h. The pulse 104h is supplied to the enable terminal ENB of the N counter 9 and the load terminals LD of the $\phi$ counter 8 and the register 10.

The N counter 9 which received at its enable terminal ENB the pulse 104h as one of the pseudo track traverse pulses h, increments the count by one by the clock pulse d supplied to the clock input terminal CK.

As the pulse 104h is supplied to the load terminals LD of the $\phi$ counter 8 and the register 10, the $\phi$ counter 8 and the count setting circuit 13 operate as follows.

The current count $C_2$ of the $\phi$ counter 8 is loaded into the register 10, and the count $C_1$ of the clock pulses d corresponding to the interval $\Delta t_1$ between the pulses 102 and 103, stored in the register 10 is subtracted from the current count $C_2$ of the $\phi$ counter 8 by the subtractor 11 ($\Delta C = C_2 - C_1$), and the difference $\Delta C$ is supplied to the adder 12. The adder 12 addes $\Delta C$ from the subtractor 11 to the current count $C_2$ of the $\phi$ counter 8 ($C_0 = C_2 + \Delta C$), The count $C_0$i supplied to the $\phi$ counter 8 which sets a maximum $\Delta t_3$ of the pulse interval, and the $\phi$ counter 8 is cleared. Thus, it is anticipated that the pulse 105 which would be generated next to the pulse 104 will be generated within the count $C_0$.

The $\phi$ counter 8 is again advanced by the clock pulses d. However, the pulse 105 of the track traverse pulses c is not generated. Accordingly, the $\phi$ counter 8 is further advanced and the count finally reaches the preset count $C_0$.

When the count reaches the preset count $C_0$, the $\phi$ counter 8 produces the pulse 106 of carry signal e as shown in FIG. 3(e) and supplies it to the variable gate circuit 15 and the OR 16.

The pulse 106 passes through the OR 16 to produce the pseudo pulse 106h of the pseudo track traverse pulse h, and the pseudo pulse 106h is supplied to the enable terminal ENB of the N counter 9 and the load terminals LD of the $\phi$ counter 8 and the register 10. The same operation is repeated. Thus, even if the pulse 105 of the track traverse pulses c is lost, the pulse 106 of the carry signal e is applied to the N counter 9 so that the pseudo track traverse pulse h (FIG. 3(h)) compensated for the loss of the pulse 105 is produced.

The pulse 106 of the carry signal e is also supplied to the variable gate circuit 15. The variable gate circuit 15 may be a counter or a monostable multivibrator. It changes the gate signal f from high level to low level upon the generation of the pulse 106 of the carry signal e. As a result, the AND 6 is deconditioned and the track traverse pulse c is not transmitted to the N counter 9. The time interval between low level gate signals f is determined by the gate width setting circuit 14, which receives the count $C_0$ from the count setting circuit 13, sets a count $C_0/2$ in the present embodiment and supplies it to the variable gate circuit 15. Accordingly, the time interval between the low level gate signals f or between deconditioning of the AND 6 is one half of a time interval $\Delta t_3$ corresponding to the count $C_0$ as shown in FIGS. 3(e) and 3(f).

As described above, when the pulse 106 of the carry signal e is generated to generate the pseudo pulse 106h, the AND 6 is deconditioned to block the track traverse pulse c in order to prevent double counting of tracks if the pulse 105 of the track traverse pulse c is generated immediately after the generation of the pseudo pulse 106h. This operation will be explained later with reference to FIG. 5.

The generation of the psuedo track traverse pulse h when one of the track traverse pulses c is lost has thus been explained with reference in FIG. 3.

Figure 4:
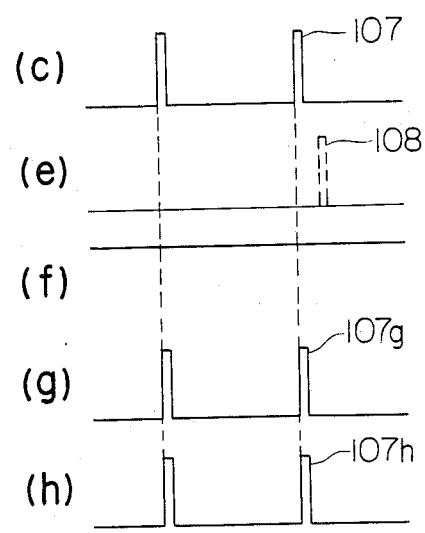
FIGS. 4(C) through 4(H) and 5(C) through 5(H) show waveforms for explaining the operation of the embodiment of FIG. 2 when correct track traverse pulses are generated.
Figure 5:
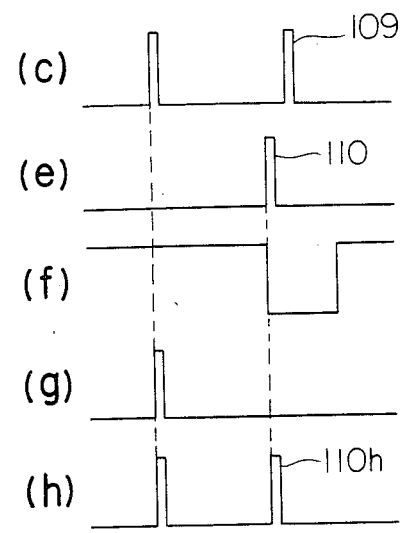

Referring to FIGS. 4 and 5, the operation when correct track traverse pulses c are generated is explained. FIGS. 4 and 5 show waveforms similar to those shown in FIG. 3. The difference output a from the differential amplifier 2, the rectangular wave b from the shaping circuit 4 and the clock pulse d from the CLK 7 are identical to those shown in FIG. 3 and they are omitted in FIGS. 4 and 5.

The correct track traverse pulses c are produced in one of two manners. In one manner, as shown in FIG. 4, the pulse 107 of the correct track traverse pulses c is produced before the pulse 108 of the carry signal e is produced, and in the other manner, as shown in FIG. 5, a pulse 109 of the correct track traverse pulses c is produced after a pulse 110 of the carry signal e has been produced.

In FIG. 4, when the pulse 107 of the track traverse pulses c is produced by the MM 5, the gate signal f is held at high level (FIG. 4(f)) because the pulse 108 of the carry signal e is not supplied from the carry terminal CR of the $\phi$ counter 8 to the variable gate circuit 15. Accordingly, the pulse 107 passes through the AND 6 to produce a pulse 107g, which passes through the OR 16 to produce a pulse 107h, which in turn is supplied to the enable terminal ENB of the N counter 9 and the load terminals LD of the $\phi$ counter 8 and the register 10. Accordingly, correct track traverse pulses are counted by the N counter 9. The $\phi$ counter 8 receives the count $C_0$ from the count setting circuit 13 and it is cleared. Therefore, the pulse 108 of the carry signal e is not produced and double counting is avoided.

In FIG. 5, when a pulse 110 of the carry signal e is produced, the pulse 110 passes through the OR 16 to produce a pulse 110h which in turn is supplied to the enable terminal ENB of the N counter 9 and the load terminals LD of the $\phi$ counter 8 and the register 10. The pulse 110 is also applied to the variable gate circuit 15 which changes the gate signal f from high level to low level (FIG. 5(f)). As the gate signal f is changed to low level, the AND 6 is deconditioned so that a pulse 109 of the track traverse pulses c, even if it is produced after the pulse 110, is not transmitted to the N counter 9. Accordingly, the pseudo track traverse pulses h from the OR 16 are correct track traverse pulses and double counting is prevented.

The time period during which the gate signal f is at the low level is set by the gate width setting circuit 14 to one half of the count $C_0$. Accordingly, double counting is prevented so long as the interval between the track traverse pulses c does not exceed 1.5 times of the time interval corresponding to the count $C_0$.

Figure 6:
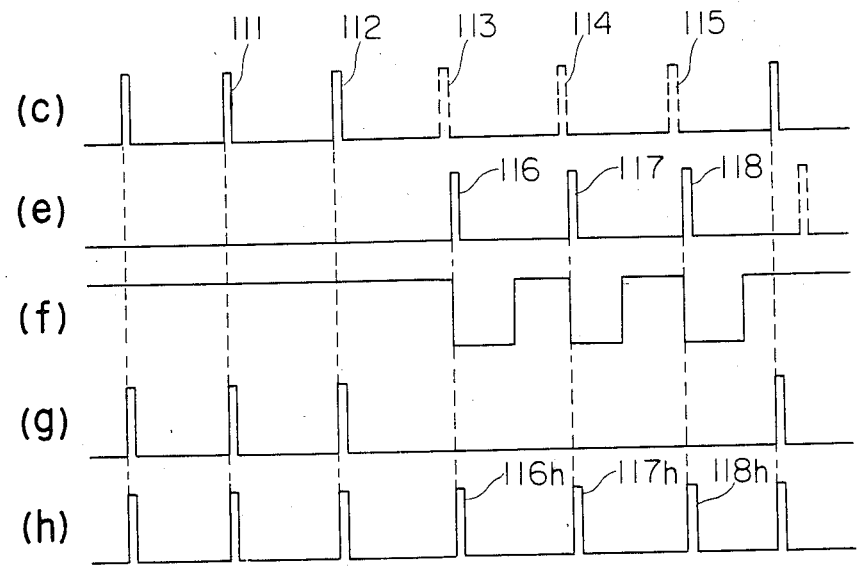
FIGS. 6(C) through 6(H) show waveforms for explaining the operation of the embodiment of FIG. 2 when the track traverse pulses are continuously lost.

FIG. 6 shows waveforms similar to those of FIGS. 4 and 5 except that a plurality of continuous track traverse pulses c are lost. The operation of the present embodiment is more repetition of the operation of FIG. 3.

If pulses 113, 114 and 115 of the track traverse pulses c are lost, a pulse 116 of the carry signal e is produced, the gate signal f is changed from high level to low level so that the AND 6 is deconditioned. The pulse 116 produces a pseudo pulse 116h.

The gate signal f is held at low level only for a period corresponding to one half of the time interval between the pulse 111 and the pulse 112, and then it is changed to high level. Similarly, a pulse 117 and a pulse 118 are generated at the interval between the pulse 112 and the pulse 116, and pseudo pulses 117h and 118h are generated. Thus, even if a plurality of continuous track traverse pulses c are lost, the pseudo pulses for compensating the loss are generated so that the N counter 9 counts the correct number of traverse tracks.

It is thus apparent from the description referring to FIGS. 3 to 6 that the losses of the track traverse pulses c is compensated by the circuit of the present embodiment, whatever the pulses are lost. In the present embodiment, since the $\phi$ counter 8 and the N counter 9 are synchronized by the common clock, error is avoided even in a high speed operation.

Figure 7:
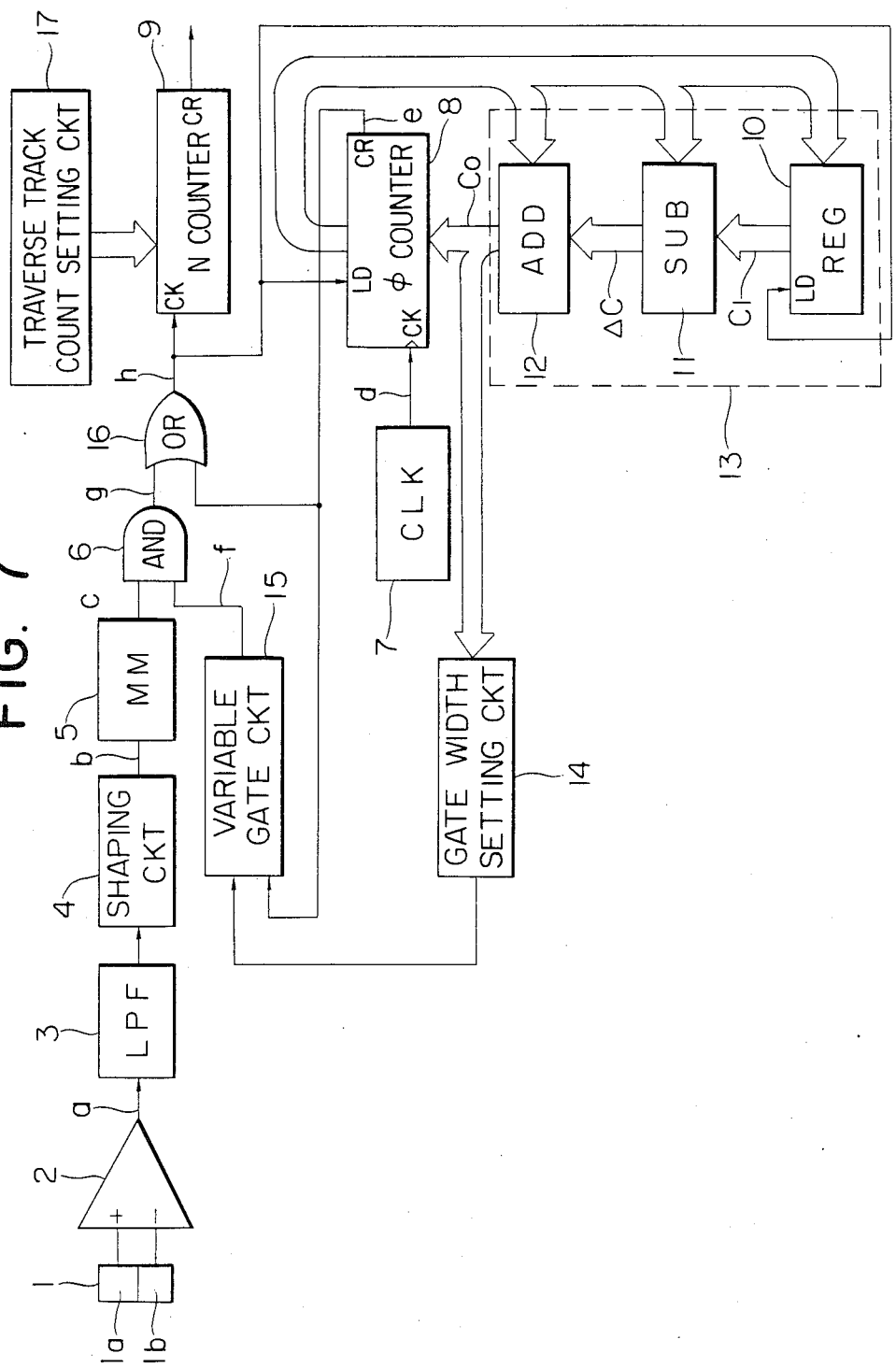
FIG. 7 is a block diagram of another embodiment of the track seek device for the optical information carrier, of the present invention.

In the embodiment shown in FIG. 7, the N counter 9 is counted up by the clock pulse d and the pseudo track traverse pulse h applied to the enable terminal ENB, although the present invention is not limited thereto. Since it is sufficient to count the pseudo track traverse pulses h, the N counter 9 may be always enabled, that is, the enable terminal ENB is always held at high level, and the pseudo track traverse pulse h may be supplied to the clock input terminal CK. In this case, it is not necessary to supply the clock pulse d to the N counter 9.

The other portions of the circuit of FIG. 7 and the operation thereof are similar to those of FIG. 2 and the explanation thereof is omitted.

In the embodiments shown in FIGS. 2 and 7, the photo-detector 1 having two photo-sensing planes is used. Therefore, the signal a may be supplied to a separate circuit to produce a tracking error signal in a record or playback mode. However, this is a mere example and the detection means in the present invention is not limited so long as it produces the track traverse signal.

The present invention can be modified in various ways other than those described above. The method and apparatus of the present invention can be applied to the information carriers other than an optical disk, such as optical tape or optical card having a plurality of tracks.

What is claimed is:

1. An apparatus for detecting track crossings on an optical information carrier, comprising:
   detection means for producing a detection signal when a track on said optical information carrier is traversed by a light spot;
   means for identifying a first time interval between detection signals immediately prior to a loss of detection signal, and for identifying a second time interval between detection signals prior to said first time interval;
   storing means for storing said first time interval and said second time interval;
   subtracting means for obtaining a difference between said first time interval and said second time interval stored in said storing means;
   means for adding an output of said subtracting means to said first time interval;
   means for setting a first preset time period to an output of said adding means;
   means for measuring a time elapsed since the detection signal has been obtained by said detection means;
   means for determining whether the detection signal has been obtained by said detection means prior to the expiration of the first preset time period;
   correction means for generating an alternative signal when the detection signal has not been obtained by the detection means prior to the expiration of the first preset time period; and
   count means for counting the detection signals produced by said detection means and the alternative signals generated by said correction means.

2. An apparatus for locating a track on an optical information carrier according to claim 1 that further includes a clock oscillator for generating a clock pulse having a sufficiently shorter period than said preset time period, a $\phi$ counter for measuring the time elapsed since the detection signal has been supplied by counting the clock pulses and generating a carry signal when the count thereof reaches a preset count corresponding to said first preset time period, and an OR gate for ORing said detection signal and said carry signal to produce detection signals and the alternative signals.

3. An apparatus for locating a track on an optical information carrier according to claim 2 that further includes a register for storing therein a count corresponding to the time interval of said detection signals and alternative signals, a subtractor for subtracting the count in said register from a current count of said $\phi$ counter, and an adder for adding an output of said subtractor to the current count of said $\phi$ counter and setting a sum in said $\phi$ counter.

4. An apparatus for locating a track on an optical information carrier according to claim 1 wherein said correction means includes gate means for blocking the detection signal for a second preset time period after the generation of said alternative signal.

5. An apparatus for locating a track on an optical information carrier according to claim 4 wherein said gate means includes a gate width setting circuit for determining said second preset time period based on said first preset time period, a variable gate circuit for producing a gate signal corresponding to said second preset time period, and an AND gate for ANDing said gate signal and said detection signal.

* * * * *